United States Patent
Choi

(10) Patent No.: US 7,333,138 B2
(45) Date of Patent: Feb. 19, 2008

(54) WHITE BALANCE ADJUSTMENT APPARATUS AND METHOD FOR A DIGITAL IMAGE DEVICE

(75) Inventor: Hyung-ok Choi, Seongnam-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 780 days.

(21) Appl. No.: 10/865,795

(22) Filed: Jun. 14, 2004

(65) Prior Publication Data

US 2005/0041115 A1 Feb. 24, 2005

(30) Foreign Application Priority Data

Jun. 19, 2003 (KR) .................... 10-2003-0039844

(51) Int. Cl.
*H04N 9/73* (2006.01)

(52) U.S. Cl. ............................. 348/225.1; 348/223.1; 382/167; 358/516

(58) Field of Classification Search .................... None
See application file for complete search history.

(56) References Cited

U.S. PATENT DOCUMENTS

| | | | | |
|---|---|---|---|---|
| 5,485,202 | A * | 1/1996 | Ueda ...................... | 348/223.1 |
| 5,619,347 | A * | 4/1997 | Taniguchi et al. .......... | 358/516 |
| 6,798,449 | B2 * | 9/2004 | Hsieh ...................... | 348/223.1 |
| 6,947,080 | B2 * | 9/2005 | Ikeda ...................... | 348/223.1 |
| 6,952,225 | B1 * | 10/2005 | Hyodo et al. ............. | 348/223.1 |
| 2007/0127093 | A1 * | 6/2007 | Kuno ....................... | 358/516 |

FOREIGN PATENT DOCUMENTS

| | | |
|---|---|---|
| EP | 0 429 992 A2 | 5/1991 |
| JP | 08-275194 | 10/1996 |
| JP | 09284439 | 10/1997 |
| JP | 11113018 | 4/1999 |
| JP | 2000102030 A * | 4/2000 |
| JP | 2000-102030 | 7/2000 |
| JP | 2000-197070 | 7/2000 |
| JP | 2002027491 | 1/2002 |
| KR | 1999019673 | 3/1999 |

* cited by examiner

*Primary Examiner*—Jingge Wu
*Assistant Examiner*—Sean Motsinger
(74) *Attorney, Agent, or Firm*—Roylance, Abrams, Berdo & Goodman, LLP

(57) ABSTRACT

An apparatus and method for a digital image device having an image-capturing device for photoelectrically changing an optical image focused through a lens unit, and for converting a signal output from the image-capturing device into a digital signal and processing input color data which is output in a predetermined period are disclosed. The apparatus and method comprise changing a range of established luminance levels every predetermined period, and luminance-dividing and storing color data, from the input color data, which belongs to the range of the established luminance level; detecting a white color out of the luminance-divided and stored color data, and setting to a range of clip luminance levels a range of luminance levels to which the detected white color belongs. The apparatus and method also comprise dividing an image captured on the image-capturing device into the predetermined number of windows, and view-dividing and storing color data in the window which belongs to the range of clip luminance levels with changing the windows every predetermined period. The apparatus and method further comprise calculating a final white color value based on the view-divided and stored color data.

19 Claims, 3 Drawing Sheets

WHITE BALANCE ADJUSTMENT APPARATUS AND METHOD FOR A DIGITAL IMAGE DEVICE

CROSS-REFERENCE TO RELATED APPLICATION

This application claims the benefit under 35 U.S.C. § 119(a) of Korean Patent Application No. 2003-39844, dated Jun. 19, 2003, in the Korean Intellectual Property Office, the entire contents of which is incorporated herein by reference.

BACKGROUND OF THE INVENTION

1. Field of the Invention

The present invention relates to a white balance adjustment method for a digital image device. More particularly, the present invention relates to a white balance adjustment method for a digital image device capable of improving a white detection capability by using luminance division and view division to reduce errors in the adjustment of the white balance.

2. Description of the Related Art

In general, even when a user photographs the same subject with a digital image camera such as a digital still camera or a digital video camera, colors in the photographs look different according to available lighting conditions such as outdoor sun light, cloudy weather, indoor white-color lamp, fluorescent lamp illumination, and so on. However, people do not feel unnatural so much since human eyes adapt themselves to such light source and accept various shades of white as being a white color. The digital image device fully responds to Red Green Blue (RGB) color components included in light sources each having a different color temperature to reproduce a color having a high color temperature as a greenish-white color and a color having a low color temperature as a reddish-white color. Accordingly, in the above situations, it is necessary to render a mixed white color as solid white, and, even when a color temperature changes, it is preferable for a white balance to be maintained at the color temperature. To accomplish this, the RGB ratio for an achromatic subject is controlled to remain a certain value, or a color difference signal such as Red-Yellow (R-Y) or Blue-Yellow (B-Y) is controlled to remain at zero. This is referred to as white balance adjustment. That is, for a greenish-white color, a red (R) gain is increased and a blue (B) gain is decreased, and, for a reddish-white color, the B gain is increased or the R gain is decreased.

In order to precisely adjust the white balance, it is necessary to precisely detect a reference white color. In order to accomplish this, a white color is ideally set which is used as a reference for a certain image-photographing environment, and the color is used to perform white balancing for a digital image device. However, it is troublesome to do this whenever photographs are taken. A method has been developed to determine a white color based on the characteristics of a subject. This method assumes that a color for a captured picture generally comes close to an achromatic color, that is, to a zero, when an integral value is used with respect to all color components included in the captured picture, which can effectively detect a white color if the captured picture has a wide color distribution inclusive of diverse colors. However, if the method is applied to instances of a narrow color distribution such as a picture photographed at sunset, on red tomatoes, or the like, it can result in an unnatural looking photograph, so means to avoid the unnaturalness need to be taken. That is, a method is required in which the white color is detected with the center portion of the captured picture cut off, portions with low color concentration levels are extracted except for portions with colors highly concentrated on the captured picture, or the like. The proposed method should be a luminance division-based method that divides a luminance level range, inputs color data by divided luminance level range, and detects a white color, a view division-based method that divides a picture-captured view into smaller views, inputs color data by divided view, and detects a white color, or the like.

However, such a luminance division-based method based on luminance levels may have a problem of having high errors when colors are corrected based on the white color data detected since the white color data detected includes solid colors and the like which have high luminance. In addition, the view division-based method may have the problem of having high errors when colors are corrected based on the detected white color since all colors existing on each and every divided view are mixed to detect the white color.

SUMMARY OF THE INVENTION

Accordingly, it is an aspect of the present invention to provide a white balance adjustment apparatus and method for a digital image device capable of precisely detecting a white color to adjust a white balance without resulting in errors.

In order to achieve the above aspects of the present invention, a digital image device having an image-capturing device for photoelectrically changing an optical image focused through a lens unit, and for converting an analog signal output from the image-capturing device into a digital signal, controlling gains, and processing input color data which is output in a predetermined period, and a related method are provided. The apparatus and method comprise changing a range of established luminance levels every predetermined period, and luminance-dividing and storing color data, out of the input color data, which belongs to the range of the established luminance level. The apparatus and method also comprise detecting a white color out of the luminance-divided and stored color data, and setting a range of clip luminance levels a range of luminance levels to which the detected white color belongs; dividing a view captured on the image-capturing device into the predetermined number of windows, and view-dividing and storing color data in the window which belongs to the range of clip luminance levels with changing the windows every predetermined period. The apparatus and method further comprise calculating a final white color value based on the view-divided and stored color data.

Preferably, the white balance adjustment apparatus and method further comprise calculating a correction value for color corrections based on the detected final white color value; and correcting the input color data in use of the correction value. Preferably, the range of established luminance levels is any one of intervals obtained by dividing a range between a minimum luminance value and a maximum luminance value in the same interval, and changing to a next divided interval every predetermined period. In addition, detecting the final white color value can comprise detecting a white color by the divided window, and calculating as the final white color value, the largest value of color data detected as a white color. Furthermore, the image-capturing device can be a Charge-Coupled Device (CCD), and the predetermined period can be either one frame period or one field period.

BRIEF DESCRIPTION OF THE DRAWINGS

The above aspects and features of the present invention will be more apparent by describing certain embodiments of the present invention with reference to the accompanying drawings, in which.

In the drawings, it should be noted that the same or similar elements are denoted by the same reference numerals even though they are depicted in different drawings.

DETAILED DESCRIPTION OF THE PREFERRED EMBODIMENT

Figure 1:
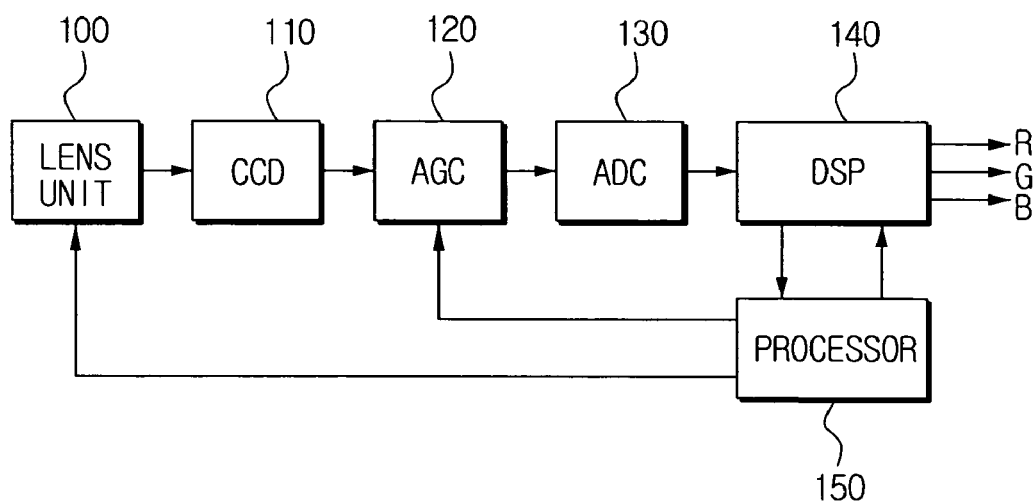
FIG. 1 is a block diagram illustrating a digital image device for adjusting a white balance according to an embodiment of the present invention.

FIG. 1 is a block diagram illustrating a digital image device for adjusting a white balance according to an embodiment of the present invention. Referring to the block diagram of FIG. 1, the digital image device has a lens unit 100, a Charge Coupled Device (CCD) 110, an Automatic Gain Control (AGC) unit 120, an Analog-to-Digital Converter (ADC) 130, a Digital Signal Processor (DSP) 140, and a processor 150.

The lens unit 100 is provided with a zoom lens for magnifying and reducing a subject, a focus lens for focusing on the subject, an iris for controlling the amount of light, and so on. The CCD 110 is used as an image-capturing device, and photoelectrically converts images captured through the lens unit 100 into an electrical signal. The CCD 110 reads and outputs charged signals at or about every frame period, that is, at or about every ⅓₀ seconds, or at or about every field period, that is, at or about every ⅙₀ seconds. The AGC unit 120 controls a gain of a signal output from the CCD 110. The ADC 130 converts an output into a digital signal, for example, a one-field or a one-frame image signal gain-controlled in the AGC unit 120. The DSP 140 encodes the converted digital image signal into an image signal of a National Television Standards Committee (NTSC) format, Phase Alternating Line (PAL) format, or the like, and has circuits necessary for other signal processing. The processor 150 inputs color data output at or about every ⅓₀ seconds or at or about ⅙₀ seconds from the DSP 140, detects a white color, and calculates Red (R) and Blue (B) gain control values for white balance adjustments in use of the detected white color, and sends the calculated R and B gain control values to the DSP 140. The DSP 140 corrects color data using the received R and B gain control values and outputs white balance-adjusted color data. The processor 150 controls overall operations of a digital image device according to the control program stored in memory (not shown).

Figure 2:
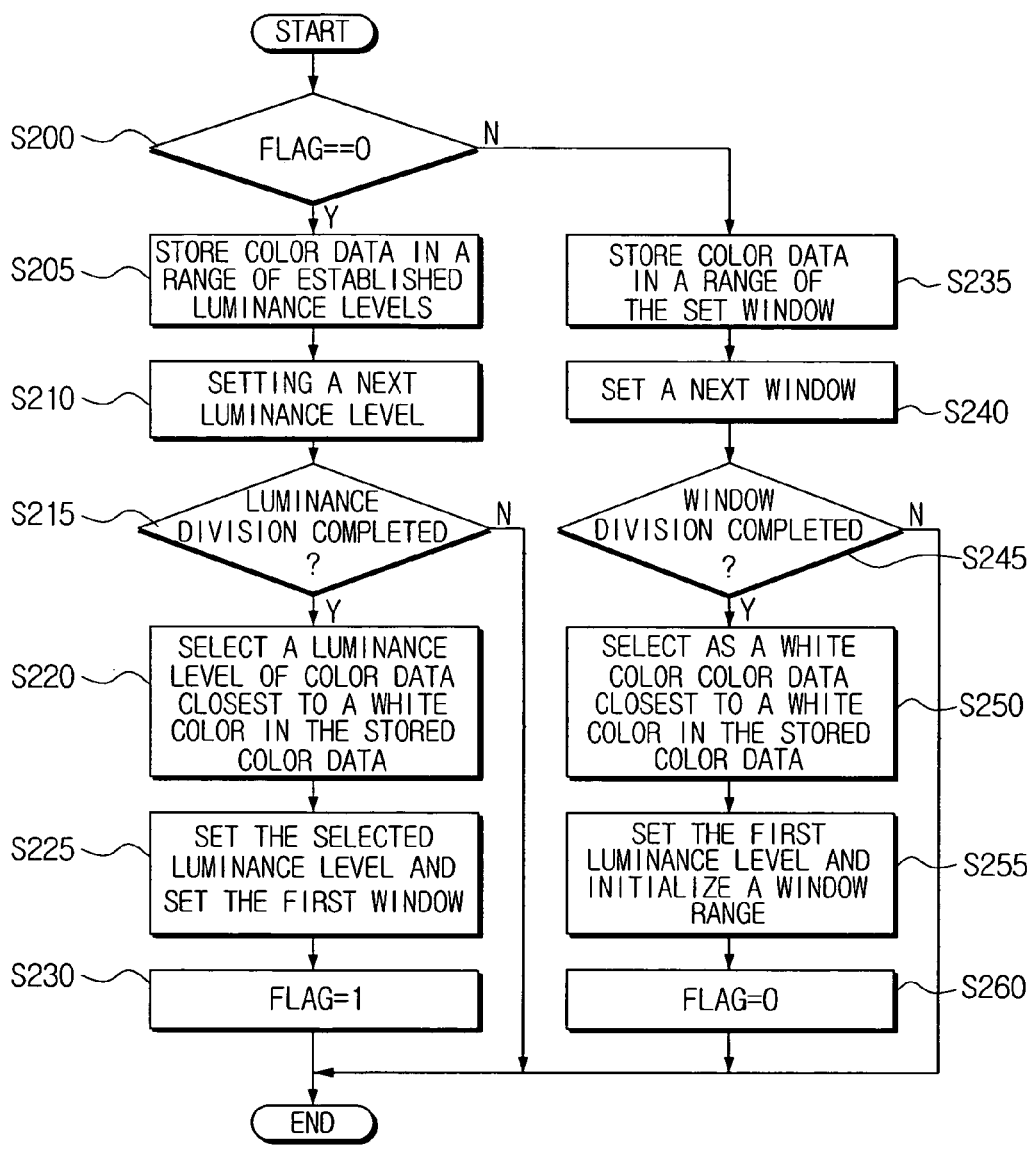
FIG. 2 is a flow chart illustrating a process for white balance adjustment according to an embodiment of the present invention.
Figure 3:
FIG. 3 and FIG. 4 are diagrams illustrating white balance adjustment according to an embodiment of the present invention.

FIG. 2 is a flow chart illustrating a white balance adjustment process according to an embodiment of the present invention. The flow chart shows steps each operating at or about every one-frame period or at or about every one-field period during which data charged in the CCD 110 used as an image-capturing device is read and output. Referring to the flow chart, first, the processor 150 determines whether a FLAG value is "0" in step S200. The FLAG value is a variable for determining whether to execute a routine related to the luminance division or to execute a routine related to the view division, and the initial FLAG value is set to "0". Accordingly, if the flag is set to "0" in step 200 step S205 is executed and the color data periodically sent from the DSP 140 in a range of established luminance levels is stored. Provided that the maximum luminance value and the minimum luminance value are denoted as lmax and lmin, respectively, and the number of divided luminance levels is denoted as n, as shown in FIG. 3, a range of the first established luminance levels refers to color data in a range of luminance values, that is, in a range denoted as "1", between lmin and [lmin+(lmax−lmin)/n]. The 150 inputs and stores only color data between the luminance levels, and sets a next luminance level in step S210. The next luminance level is a value obtained when the lower and upper values of a previous luminance level are incremented by (lmax−lmin)/n respectively, which refers to a range denoted as "2" in FIG. 3. If the next luminance level is completely set, the processor 150 determines whether the luminance division is completed in step S215. If the luminance division is not completed, the processor 150 repeats steps S200 through S215 when color data is input during the next period, and inputs and stores color data up to a range belonging to a luminance level corresponding to the nth range shown in FIG. 3, illustratively shown as n−1 and n. Accordingly, if the luminance division is completed, the color data is divided into n luminance levels, and each divided color data is stored.

If the luminance division is completed, the processor 150 searches for color data closest to a white color based on the color data divided and stored in the n luminance levels, and selects a luminance level belonging to the color data in step S220. Further, the processor 150 selects the selected luminance level to be a clip luminance level for use in the view division, and sets the first window for use in the view division in step S225. Thereafter, the processor 150 sets the Flag value to "1" in step S230, and executes a routine related to the view division from the next period.

Figure 4:
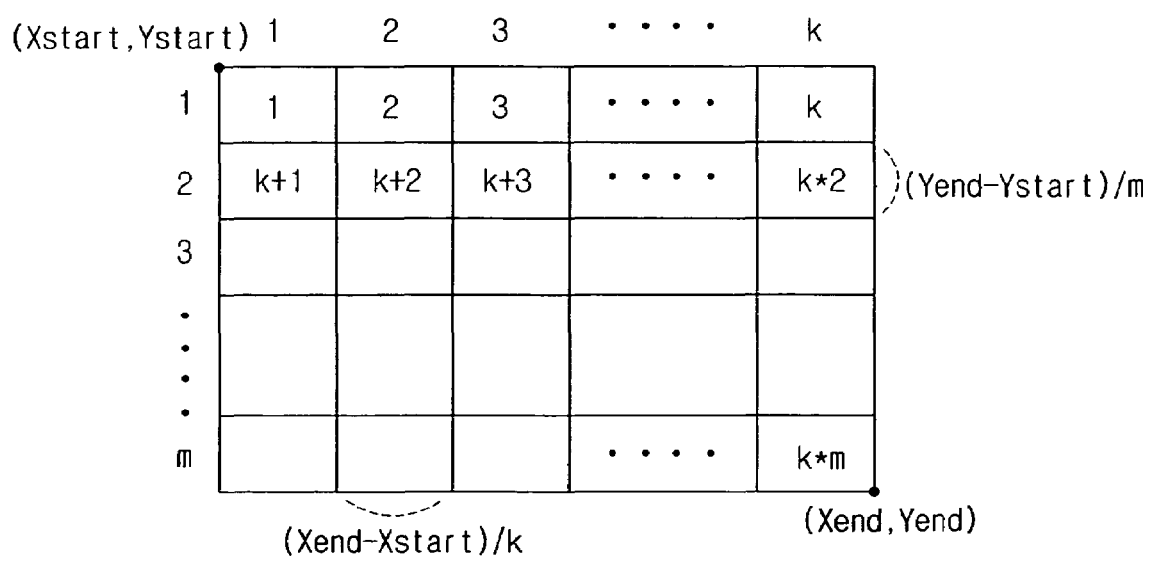

Since the FLAG value is "1" in the next operation period, the processor 150 determines the FLAG value in step S200, and stores the color data belonging to the range of the clip luminance level out of the color data pertaining to the first window in step S235. As shown in FIG. 4, provided that the coordinates of an upper left end point of a view captured through an image-capturing device is denoted as Xstart for an X axis and Ystart for a Y axis and the coordinates of a upper lower end point of the view is denoted as Xend for the X axis and Yend for the Y axis, the first window refers to a range, that is, a range denoted as "1", enclosed with the upper left end point coordinates Xstart and Ystart for the X and Y axes, respectively, and the lower right end point coordinates [Xstart+(Xend−Xstart)/k] and [Ystart+(Yend−Ystart)/m] for the X and Y axes, respectively. Out of the color data in the range, the processor 150 inputs and stores the color data belonging to a range of the clip luminance level established in the luminance division. If the color data pertaining to the first window is completely stored, the processor 150 sets a next window in step S240. The next window refers to a range denoted as "2" in FIG. 4, so the coordinates of the Y axis for the respective end points of the first window are not changed, but the coordinates of the X axis are incremented by (Xend−Xstart)/k. The window is changed every color data input period, and, if the color data is completely stored up to the window denoted as k*m, the window division is completed.

If the window division is completed, the processor 150 selects as a white color value the closest color data out of k*m color data each stored by window in step S250. If the processor 150 selects as a final white value the color data with the highest value. If the final white color value is completely selected, the processor 150 sets a range of the first luminance level and initializes a window range as the first window in order to execute a routine based on the luminance division as aforementioned, and initializes the window range as the first window in step S255. Further, the processor 150 sets the FLAG to "0", and repeats the above steps during a next period. The processor 150 calculates R and B gain control values for color corrections based on the selected white color value. The calculated R and B gain control values are transferred to the DSP 140 in order for a color data gain to be controlled, so that colors are corrected. As previously described, the white balance adjustment method first determines a range of luminance levels to which a white color belongs using the luminance division, and selects a final white value through the view division in the determined range of luminance levels, to thereby enable a relatively precise white color to be detected as well as enable the white balance to be adjusted without errors in use of the detected final white value.

As described above, the embodiments of the present invention detects luminance levels to which a white color belongs using luminance division, and detects a final white color value through the view division in a range of the detected luminance levels, to thereby detect a relatively precise white color. Further, the embodiment of the present invention adjusts the white balance using a detected white value, to thereby obtain good-quality images that are appear natural on digital image devices.

Although a certain embodiment of the present invention has been described, it should be understood by those skilled in the art that the present invention should not be limited to the described embodiment, but various changes and modifications can be made within the spirit and scope of the present invention as defined by the appended claims.

What is claimed is:

1. A white balance adjustment method for a digital image device having an image-capturing device for photoelectrically changing an optical image focused through a lens unit, and for converting a signal output from the image-capturing device into a digital signal and processing input color data which is output in a predetermined period, comprising the steps of:
   changing a range of established luminance levels every predetermined period, and luminance-dividing and storing color data, from the input color data, which belongs to the range of the established luminance level;
   detecting a white color out of the luminance-divided and stored color data, and setting a range of luminance levels to which the detected white color belongs for a range of clip luminance levels;
   dividing an image captured on the image-capturing device into a predetermined number of windows, and view-dividing and storing color data in the window which belongs to the range of clip luminance levels with changing the windows every predetermined period; and
   calculating a final white color value based on the view-divided and stored color data.

2. The white balance adjustment method as claimed in claim 1, further comprising the steps of:
   calculating a correction value for color corrections based on the detected final white color value; and
   correcting the input color data using the correction value.

3. The white balance adjustment method as claimed in claim 1, wherein the range of established luminance levels is any one of intervals obtained by dividing a range between a minimum luminance value and a maximum luminance value in the same interval, and changing to a next divided interval every predetermined period.

4. The white balance adjustment method as claimed in claim 1, wherein the step for detecting the final white color value detects a white color by the divided window, and calculates as the final white color value the color data detected as a white color having the highest value.

5. The white balance adjustment method as claimed in claim 1, wherein the image-capturing device is a Charge-Coupled Device (CCD).

6. The white balance adjustment method as claimed in claim 1, wherein the predetermined period is either one frame period or one field period.

7. An apparatus for adjusting a white balance for an image-capturing device, the apparatus comprising:
   a digital image device having an image-capturing device for photoelectrically changing an optical image focused through a lens unit, and for converting a signal output from the image-capturing device into a digital signal and processing input color data which is output in a predetermined period;
   a lens unit adapted to optically detect an object;
   an automatic gain control (AGC) unit adapted to control a gain for a signal output from the image-capturing device; and
   a controller adapted to change a range of established luminance levels every predetermined period, and luminance-divide and store color data, from the input color data, which belongs to the range of the established luminance level; to detect a white color out of the luminance-divided and stored color data, and set a range of luminance levels to which the detected white color belongs for a range of clip luminance levels; to divide an image captured on the image-capturing device into a predetermined number of windows, and view-divide and store color data in the window which belongs to the range of clip luminance levels with the changed the windows every predetermined period; and to calculate a final white color value based on the view-divided and stored color data.

8. The apparatus of claim 7, wherein the controller is further adapted to calculate a correction value for color corrections based on the detected final white color value; and to correct the input color data via the correction value.

9. The apparatus of claim 7, wherein the range of established luminance levels is any one of intervals obtained by dividing a range between a minimum luminance value and a maximum luminance value in the same interval, and changing to a next divided interval every predetermined period.

10. The apparatus of claim 7, wherein the controller is further adapted to detect a white color by the divided window, and calculate as the final white color value the color data detected as a white color having the highest value.

11. The apparatus of claim 7, wherein the image-capturing device is a Charge-Coupled Device (CCD).

12. The apparatus of claim 7, wherein the predetermined period is either one frame period or one field period.

13. The apparatus of claim 7, wherein the lens unit comprises a zoom lens, a focus lens and an iris.

14. The apparatus of claim 13, wherein the zoom lens is adapted to magnify or reduce a subject to be photographed.

15. The apparatus of claim 13, wherein the focus lens is adapted to focus the image-capturing device on the subject.

16. The apparatus of claim 13, wherein the iris is adapted to control the amount of light to the image-capturing device.

17. The apparatus of claim 11, wherein the CCD is adapted to photoelectrically convert images captured through the lens unit into an electrical signal.

18. The apparatus of claim 7, further comprises:
a Digital Signal Processor (DSP) adapted to convert a digital image signal into at least one of a National Television Standards Committee (NTSC) format and a Phase Alternating Line (PAL) format.

19. The apparatus of claim 7, further comprises:
an Analog to Digital Converter (ADC) adapted to convert an analog signal from the AGC into a digital signal.

* * * * *